United States Patent
Biskeborn et al.

(10) Patent No.: US 7,841,069 B2
(45) Date of Patent: Nov. 30, 2010

(54) METHOD FOR MANUFACTURING A THIN CLOSURE MAGNETIC HEAD

(75) Inventors: Robert G. Biskeborn, Hollister, CA (US); Calvin S. Lo, Saratoga, CA (US)

(73) Assignee: International Business Machines Corporation, Armonk, NY (US)

(*) Notice: Subject to any disclaimer, the term of this patent is extended or adjusted under 35 U.S.C. 154(b) by 589 days.

(21) Appl. No.: 11/848,183

(22) Filed: Aug. 30, 2007

(65) Prior Publication Data

US 2009/0059421 A1    Mar. 5, 2009

(51) Int. Cl.
*G11B 5/127*  (2006.01)
*H04R 31/00*  (2006.01)

(52) U.S. Cl. ............... 29/603.16; 29/603.07; 29/603.13; 29/603.14; 29/603.15; 29/603.18; 125/12; 125/13.01; 125/35; 216/22; 216/52; 216/53; 216/88; 216/89; 360/121; 360/122; 360/317

(58) Field of Classification Search ............. 29/603.07, 29/603.13–603.16, 603.18; 216/22, 52, 53, 216/88, 89, 95; 125/12, 13.01, 35; 360/121, 360/122, 317; 451/5, 41
See application file for complete search history.

(56) References Cited

U.S. PATENT DOCUMENTS

| | | | |
|---|---|---|---|
| 5,309,457 A * | 5/1994 | Minch | 372/34 |
| 6,043,590 A * | 3/2000 | Gilmore | 310/367 |
| 6,351,481 B1 * | 2/2002 | Marcomber et al. | 372/50.1 |
| 6,712,985 B2 | 3/2004 | Biskeborn | |
| 6,863,061 B2 | 3/2005 | Deshpande et al. | |
| 2005/0122631 A1 | 6/2005 | Biskeborn et al. | |

* cited by examiner

*Primary Examiner*—Paul D Kim
(74) *Attorney, Agent, or Firm*—Jeffrey P. Aiello

(57) ABSTRACT

A method of manufacturing thin closure magnetic read/write heads, such as magnetic tape heads is provided. The method provides improved flexural strength of the closure so that the closure breakage during fabrication of the heads is mitigated and closure thickness is reduced. An array of chips is fabricated on a wafer. The array is closed, with a closure strip bonded to each row of the array. Closures span only the length of a row, so that the closures are not subjected to flexure during processing and breakage due to flexure is mitigated. Side bars are bonded to the array to form a column with dimensions similar to prior art columns. This allows columns manufactured by the invention to undergo additional processing using existing processes.

12 Claims, 8 Drawing Sheets

US 7,841,069 B2

METHOD FOR MANUFACTURING A THIN CLOSURE MAGNETIC HEAD

BACKGROUND OF THE INVENTION

1. Field of the Invention

The present invention relates to magnetic head fabrication, and more particularly, to an improved method of manufacturing thin closure magnetic read/write heads.

2. Background Information

Nonvolatile storage media technologies, such as magnetic discs, magnetic tape cartridges, and optical disk cartridges are well known. Data storage technology is continually pushed to increase storage capacity and reliability. Decreased bit dimensions have lead to increased data storage densities in magnetic storage media, such as magnetic tape.

Thus, improvement in magnetic medium data storage capacity is achievable, in part, from improvements in the magnetic head assemblies used for reading and writing data on the magnetic storage media. More data tracks on the magnetic tape are made possible by reducing the feature sizes of read and write elements of the head, such as by using thin-film fabrication techniques, to build the heads.

Magnetic tape is passed transversely along a tape path across a write module and a read module of a head assembly for writing data to and reading data from the tape. A critical aspect for tape recording is the ability to read data while it is being recorded. This so-called read-verify, on read-while-write, mode ensures that data is written correctly. If an error is found, writing may stop or data may be re-written. There is a gap between the write elements of the write module and the read elements of the read module, known as "gap-to-gap distance". As the tape passes between the write and read modules, the tape can "mistrack", where data is written to or read from the wrong data track, due to the tape skewing as is passes across the gap between the read and write modules. Reducing the gap-to-gap distance between the read and write modules is known to reduce mistracking and reduce errors in reading and writing data and may afford a greater data transfer rate.

Three module head assemblies are emerging for writing and reading data to the tape to improve data transfer rate and reduce mistracking. Three module head assemblies may include two write modules separated by a read module. In three module head assemblies, the gap distance between the read module and the write module is about half the gap-to-gap distance of two module head assemblies, while the gap between the two write modules is about equal to the gap-to-gap distance of two module head assemblies. The reduced gap-to-gap distance of three module head assemblies reduces data read and write errors due to mistracking and increases performance reliability. To achieve the reduced gap-to-gap distance, a thin closure not found in the prior art is needed.

To reduce the wear of the read/write elements of the read and write modules, closures are bonded to the read and write heads. Bonding a relatively thin closure to the heads of the write modules also ensures proper tape contact on the tape bearing surfaces of the head assembly and reduced wear of the heads.

Prior Art FIG. 1 to FIG. 5 illustrate a method for bonding closures to an array of chips. FIG. 1 illustrates a mini-quad of chips 200 that has been cut from a wafer (not shown). The mini-quad 200 includes two columns, shown generally at 202, with an array of chips 204 in each column 202. Each array 204 comprises several rows 206, with each row 206 comprising a chip 208 and auxiliary circuits 210.

Each chip 208 may comprise several read and write elements or devices (not shown). For example, a chip 208 may comprise 16 read elements or 16 write elements or both and 2 servo elements. A chip 208 may also be referred to in the art as a "wafer chip" or "chip image". The auxiliary circuits 210 are often referred to in the art as electrical lap guides (ELGs), and are referred to as ELGs hereinafter.

The chips 208 and ELGs 210 are formed on a common substrate in a deposition of metallic and non-metallic layers, to form the mini-quad 200. Patterning of the chips 208 and ELGs 210 is accomplished using processes such as photolithography in combination with etching and lift-off processes, for example. After the chips 208 and ELGs 210 are formed, the mini-quad 200 is cut from the wafer. The mini-quad 200 is about 47 mm in length, with each column 202 about 23 mm in length including both the chips 208 and ELGs 210.

Once the mini-quad 200 is formed, closures are attached to the rows 206. Prior art FIG. 2 shows an array of closures 300 that will be bonded to the mini-quad 200. The array 300 comprises a plurality of strips of closures 302 that extend outwardly from a top portion 304. The array of closures 300 comprises a known substrate material, such as Aluminum oxide Titanium carbide ($Al_2O_3TiC$).

Prior art FIG. 3 illustrates how the array 300 is bonded to the mini-quad 200. FIG. 4 depicts the array 300 bonded to the mini-quad 200. The array 300 bonds to the mini-quad 200, such that a closure strip 302 is bonded to each row 206 of the mini-quad 200. The closures 302 are provided to protect the magnetic transducers 208.

Once the array 300 is bonded to the mini-quad 200, the top portion 304 of the closures 302 may be removed prior to slicing the mini-quad 200 into rows 206. Grinding may be used to remove the top portion 304 of the array 300, to expose the closures 302 (shown in FIG. 5). After the top portion 304 is removed, the closures 302 may be lapped to a desired width. As can be appreciated, the closure strips 302 are very thin, less than 500 micrometers thick, and extend the length of the mini-quad 200.

The strips of closures 302 can be subjected to flexure during processing. Due to their length and small dimensions, the closures 302 are mechanically fragile. With thicknesses in the range of about 25 to 50 micrometers anticipated in the future, the closures may be more fragile.

Smaller chip images, known as mini-chiplets, allow more devices to be fabricated per wafer, which increases device per wafer yield and can reduce manufacturing costs. The reduced dimensions of arrays of mini-chiplets necessitates a closure design that is robust enough to withstand fabrication and handling processes.

Thus, it would be advantageous to provide a column that comprises chips of reduced dimensions, yet maintains the dimensions of existing columns to facilitate additional processing of the mini-quad with existing processes. Additionally, it would be advantageous to provide a method of fabricating read/write heads with thin closures.

SUMMARY OF THE INVENTION

An embodiment of the invention comprises a method of manufacturing thin closure magnetic read/write heads, such as magnetic tape heads. The method reduces flexural strain in the closure during fabrication of mini-chiplet heads, so that closure fabrication may have better yield and closure thickness can be reduced.

An array comprising several rows, with each row comprising a chip, where each chip comprises primarily active devices, is fabricated on a wafer. Each chip may contain read or write elements or both. Closure strips are attached to each row of the array using known methods. The closure strips span only the length of a row, so that the closures are not subjected to flexure during subsequent processing steps. The closures then may be lapped relatively thin, since exposure of the closures due to flexure during subsequent processing is mitigated.

Once the closures are lapped, a side bar is bonded to a side of the array to form a column. The side bar is dimensioned to provide a column with dimensions similar to prior art columns, when bonded to the array. In one embodiment, a side bar is bonded to each side of the array and to ends of the closures, to form a column with dimensions similar to prior art columns. This allows columns manufactured by the invention to undergo additional processing using existing processes.

A plurality of grooves may be formed in a face of the side bars to form ridges. The ridges are aligned with the closure strips, to provide a column that is configured substantially similar to prior art columns to facilitate processing of the column with existing processes. The columns may be lapped so that the closures and side bar ridges are coplanar.

In another embodiment, a U-shaped column section is bonded to the array. The U-shaped column section has dimensions similar to prior art columns. A wafer substrate is ground to form a column comprising two side bars and closures that extend between the side bars. The array is bonded to the column, with a strip of closures bonded to each row of the array. A face of the column section may be configured with ridges as noted above. The face may be ground to expose the strips of closures. The ridges and closures may be lapped to a desired thickness. The column formed in this embodiment has dimensions similar to prior art columns to afford additional processing with existing processes.

BRIEF DESCRIPTION OF THE DRAWINGS

Prior Art

Prior Art

Prior Art

Prior Art

Prior Art

DESCRIPTION OF THE PREFERRED EMBODIMENTS

A method of manufacturing thin closure magnetic read/write heads, such as magnetic tape heads. The method reduces flexure of the closure during processing of the head, so that breakage of the closure during fabrication of the heads is mitigated and closure thickness can be reduced. A mini-chiplet array of chips is fabricated on a wafer. The array is closed, with a closure strip bonded to each row of the array. A closure strip spans only the length of the row, so that the closures are not subjected to flexure during processing. This allows for the closures to be lapped very thin. Side bars are bonded to the array to form a column with dimensions similar to prior art columns. This allows columns manufactured by the invention to undergo additional processing using existing processes.

Figure 1:
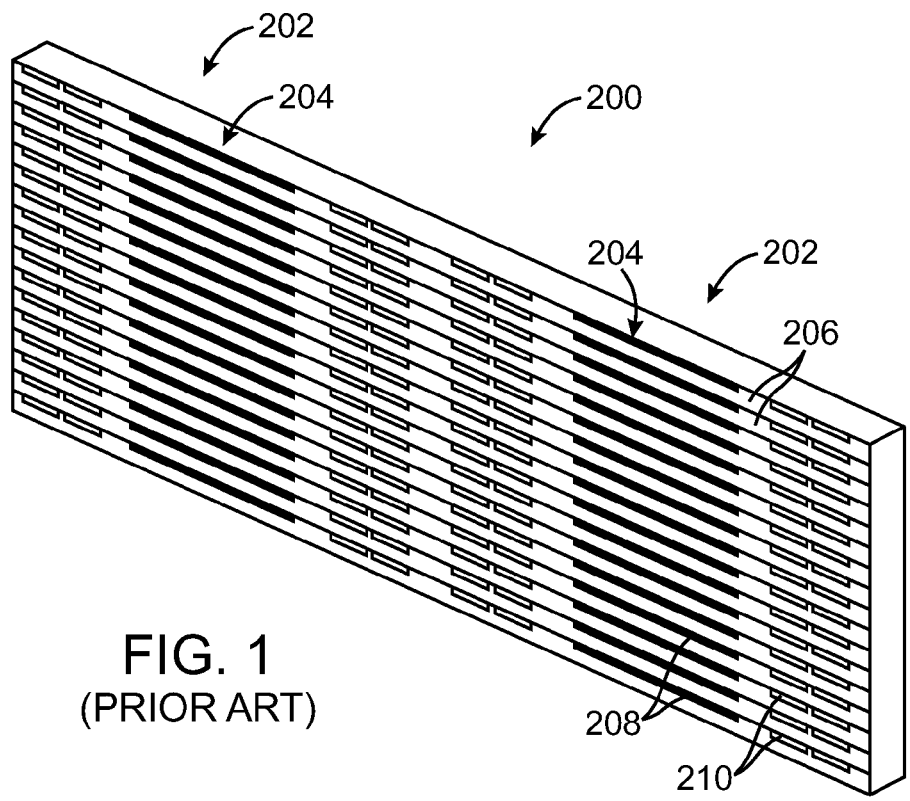
FIG. 1 illustrates a prior art mini-quad of magnetic elements that have been cut from a wafer.
Figure 2:
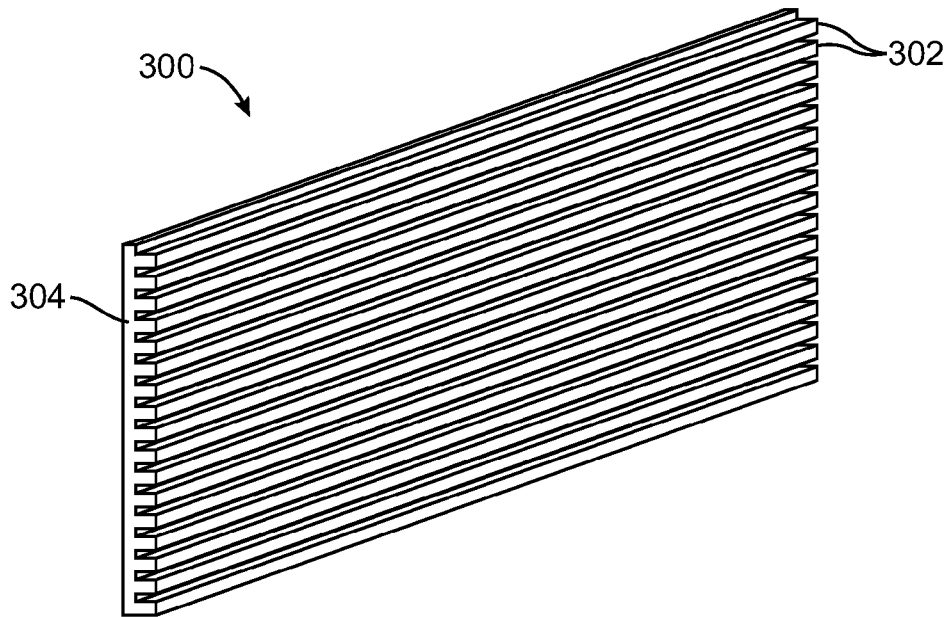
FIG. 2 is a perspective view of an array of closures.
Figure 3:
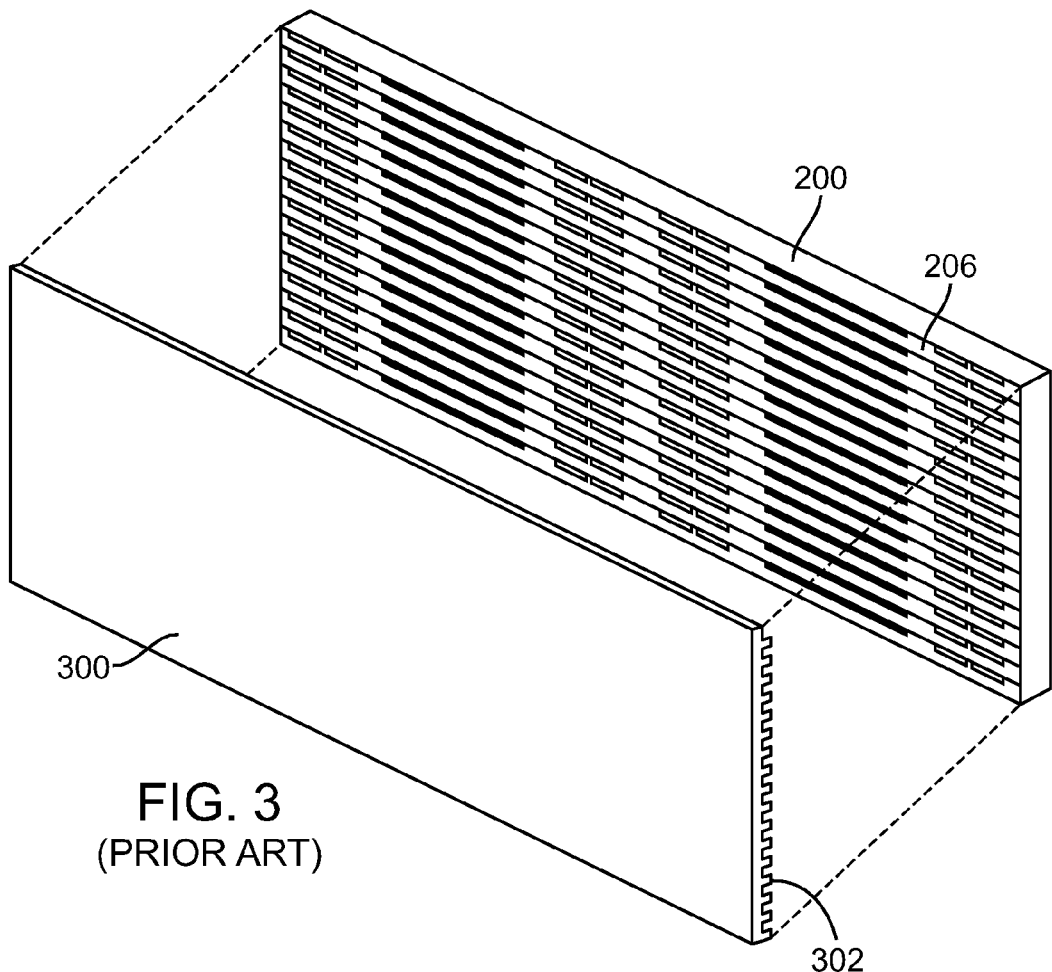
FIG. 3 is a perspective view depicting coupling of the array of closures to the mini-quad.
Figure 4:
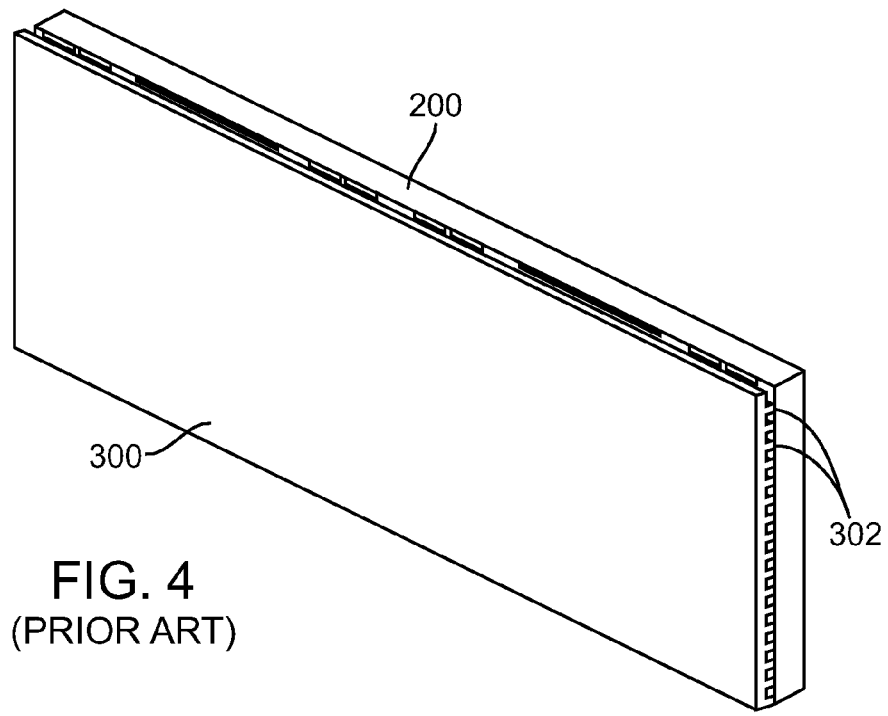
FIG. 4 is a perspective view of the array of closures coupled to the mini-quad.
Figure 5:
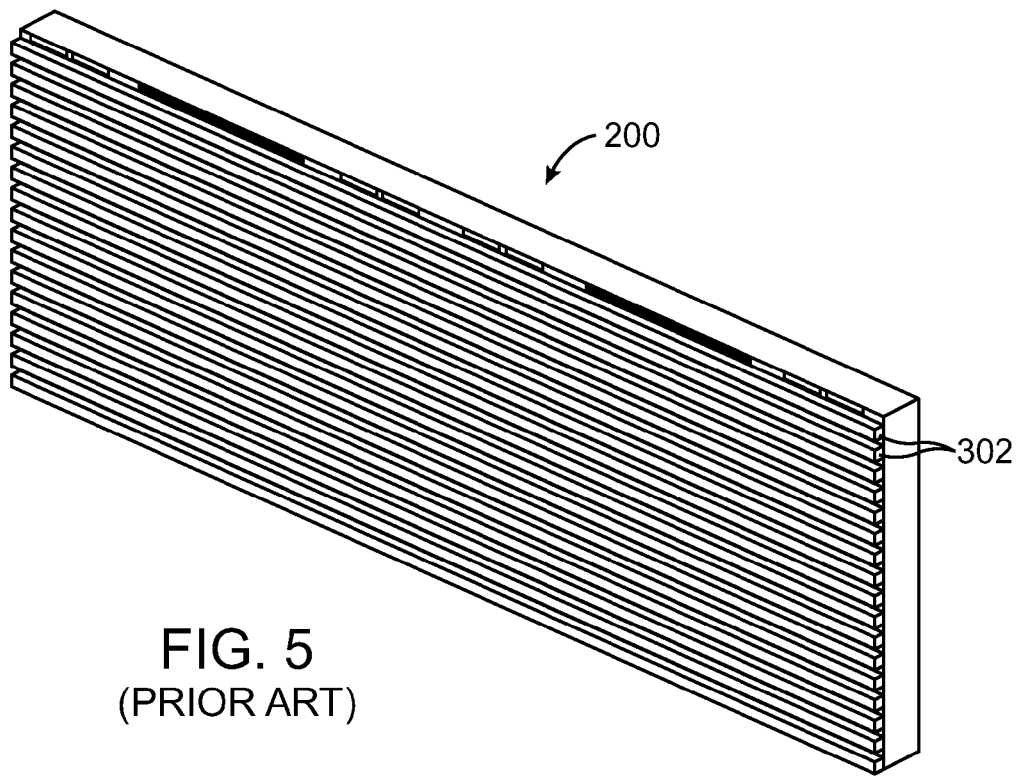
FIG. 5 illustrates a mini-quad of magnetic elements including a plurality of closures that have been bonded thereto.
Figure 6:
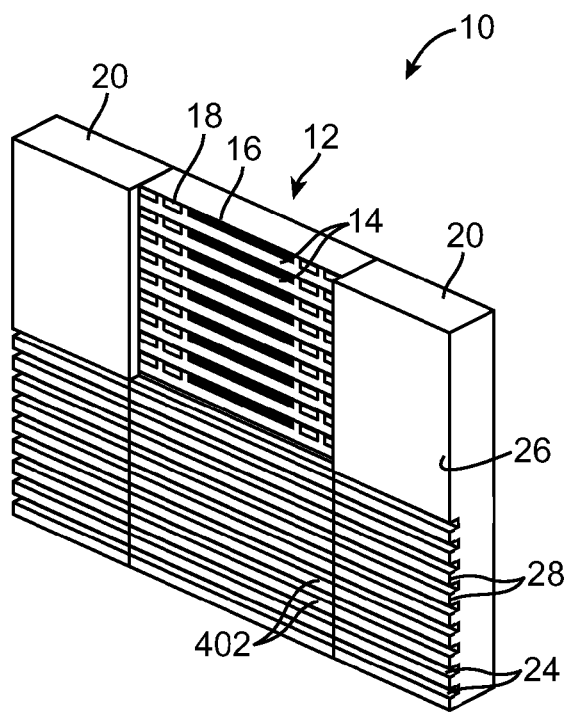
FIG. 6 illustrates a partially fabricated mini column of magnetic mini-chips that has been constructed according to one embodiment of the invention.
Figure 7:
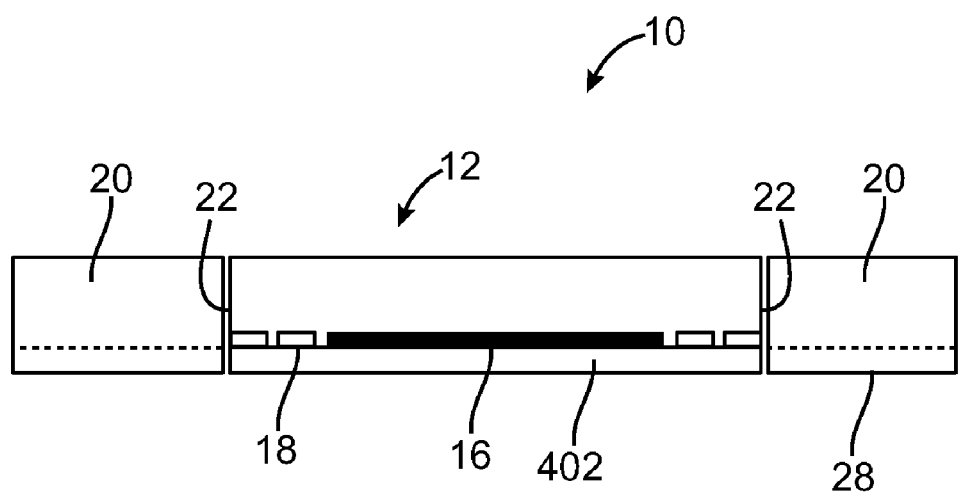
FIG. 7 illustrates a partially exploded top plan view of the column of magnetic chips of FIG. 6.

Referring to FIG. 6 and FIG. 7, there is shown, generally at 10, a partially constructed mini-chiplet column, fabricated according to one embodiment of the invention. The invention comprises a method of fabricating magnetic read/write heads, such as magnetic tape heads with a thin closure. In the method, an array 12, that comprises several rows 14 of chips 16, is fabricated. An array 12 often comprises 17 rows 14 of chips 16, for example. Each row 14 of the array 12 typically comprises a chip 16 and auxiliary circuits 18. The auxiliary circuits 18 are sometimes referred to in the art as electrical lap guides (ELGs), and will be referred to hereinafter as ELGs 18. Each chip 16 may comprise several read and write elements (not shown). For example, a chip 16 may comprise 16 read elements or 16 write elements or both and 2 servo elements. A chip 16 is also referred to in the art as a "chip image", but is referred to herein as a "chip" for the ease of discussion only.

The chips 16 and ELGs 18 are fabricated on a common substrate in a deposition of metallic and non-metallic layers, as is well known. Patterning of the chips 16 and ELGs 18 may be accomplished using known processes such as photolithography in combination with etching and lift-off processes.

A chip comprising read and write elements of reduced size and pitch is known in the art as a "Mini-chiplet". Using mini-chiplets, rather than full span chips, increases device yield per wafer and reduces manufacturing costs. The dimensions of the ELGs of mini-chiplets are also reduced. For example, the chip of a mini-chiplet may be about 10 mm long and the ELGs may be about 1.5 mm long. The array 12 shown in FIGS. 6, 7, 9, 10, 12, 13, and FIG. 14, comprises an array of mini-chiplets in one embodiment.

Once the rows of chips 16 and ELGs 18 are fabricated, the array 12 is closed using known methods. Closures are a common part of post-wafer processing in view of the benefits they afford in resultant heads. More information on the manufacture and use of closures and their related benefits may be found with reference to US. Pat. Nos. 5,883,770 and 5,905,613 which are incorporated herein by reference.

Figure 8:
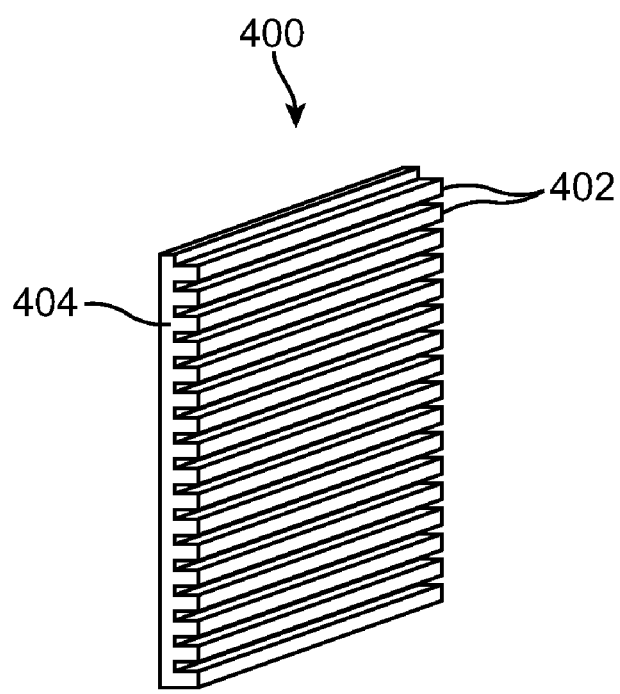
FIG. 8 is a perspective view of a closure quad.
Figure 9:
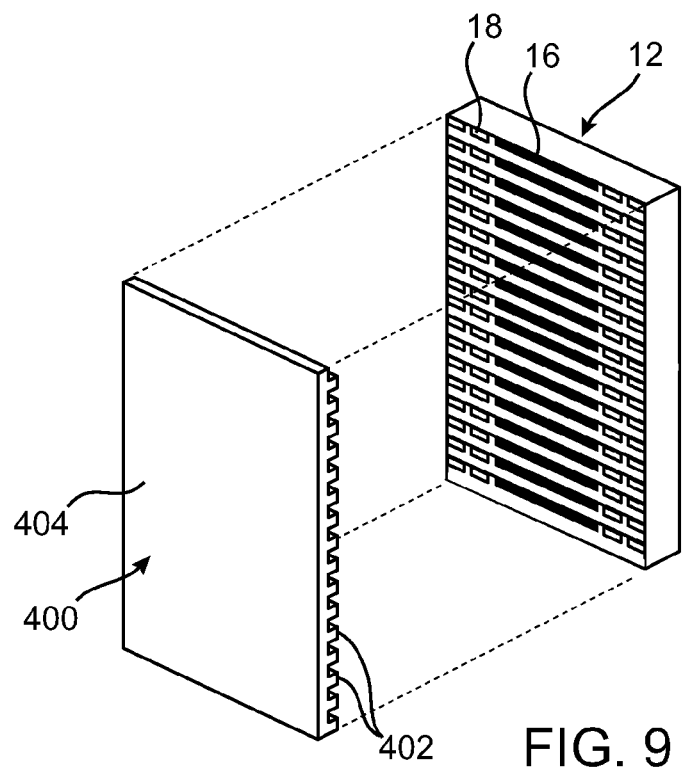
FIG. 9 is a perspective view depicting coupling of the closure quad to an array of chips.
Figure 10:
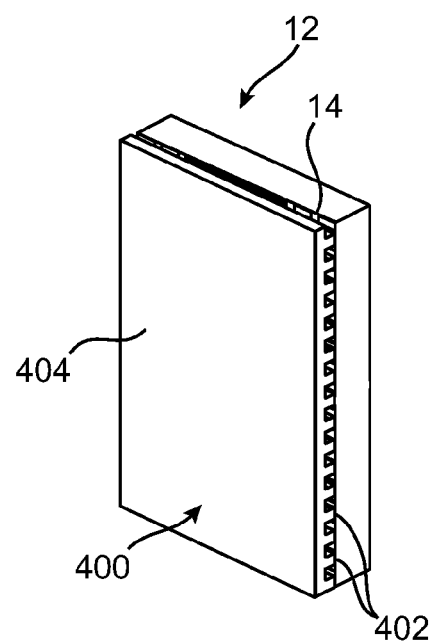
FIG. 10 is a perspective view of the closure quad to coupled to the array of chips.

Referring to FIGS. 8-10, an array of closures, or closure quad, 400 is bonded to the array 12. The closure quad 400 comprises a plurality of closure strips, or closures, 402 that extend outwardly from a top portion 404. The closure quad 400 comprises a known substrate material, such as Aluminum oxide Titanium carbide ($Al_2O_3TiC$). FIG. 9 illustrates how the closure quad 400 is bonded to the array 12. FIG. 10 depicts the closure quad 400 bonded to the array 12. The closure quad 400 bonds to the array 12, such that closure strips 402 are bonded to each row 14.

Once the closure quad 400 is bonded to the array 12, grinding may be used to remove the top portion 404 of the closure quad 400, to expose the closure strips 402 (shown in FIGS. 6 and 7). After the top portion 404 is removed, the closures 402 may be lapped to a desired width. Since the closure strips 402 span only the width of the array 12, the closures 402 are not subjected to flexure during subsequent processing steps of the column 10 and can be lapped very thin. The closure strips 402 are lapped to a maximum thickness of about 500 micrometers. Typically the closures 402 are lapped to a thickness ranging from about 280 micrometers to 250 micrometers. In one embodiment, the closures 402 are lapped to a thickness ranging from about 25 to 50 micrometers. The method does not subject the closure strips 402 to flexure or other adverse processing events during subsequent processing of the chips 16, and thus may provide fabrication of the mini-chip configuration of read/write heads with closures of this reduced width.

As shown in FIGS. 6 and 7, once the closure strips 402 are lapped, a side bar 20 may be bonded each side 22 of the array 12 to form the column 10. The side bars 20 comprise a suitable known substrate material. Preferably, the side bars 20 comprise a substrate material that has similar wear resistance and thermal and mechanical characteristics as the material comprising the closures 402 and the wafer substrate material of the array 12. In one embodiment, the side bars 20 may comprise Aluminum oxide Titanium carbide ($AL_2O_3TiC$).

The side bars 20 are dimensioned to provide a column 10 with dimensions similar to prior art columns, when bonded to the array 12. It is to be understood that the side bars 20 may be as narrow or as wide as desired. Particularly, the side bars 20 may be as narrow or as wide as needed, determined by head function requirements and by tape width and width of data bands on the tape (both not shown).

Grooves 24 may be formed in a face 26 of the side bars 20 to provide ridges 28 that are aligned with the closure strips 402 to provide a column 10 that further facilitates processing of the column 10 with existing processes. For example, a plurality of grooves 24 may be machined in the face 26 of the side bars 20 using known methods. The grooves 24 are formed so that the ridges 28 align with the closure strips 402. The side bars 20 are then bonded to the array 12, with the ridges 28 aligned with the closure strips 402 to form the column 10. The closure strips 402 and face 26 of the side bars 20 may be lapped so that the ridges 28 are coplanar with the closures 402.

Figure 11:
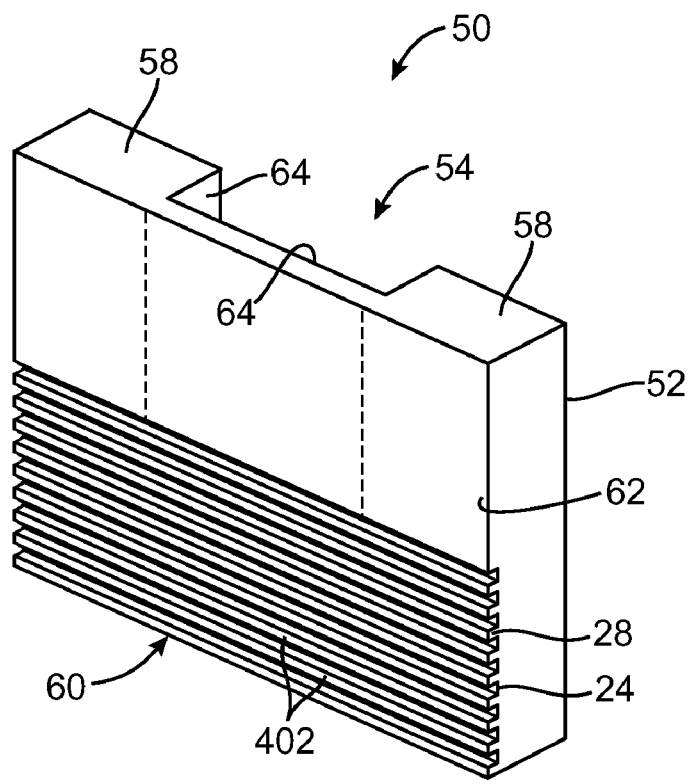
FIG. 11 illustrates a partially fabricated a column section that has been constructed according an alternative embodiment of the invention.
Figure 12:
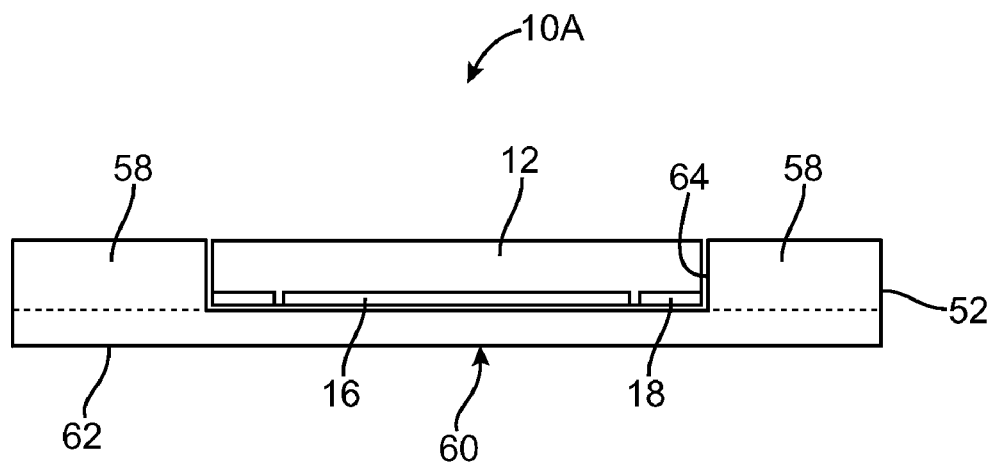
FIG. 12 illustrates a top plan view showing an alternative embodiment of a column that has been constructed with the column section of FIG. 11.

FIG. 11 and FIG. 12 illustrate another embodiment of the invention. Therein, a column section 50 is bonded to the array 12 to form a column 10A. In this embodiment, the column section 50 comprises a wafer substrate 52 of a suitable substrate material, such as $Al_2O_3TiC$. A channel 54 is formed in the wafer substrate 52, using known methods, such as grinding. The channel 54 is formed in the wafer 52, such that the column section 50 includes at least one side bar section 58 and a closure section 60. In the embodiment shown, the channel 54 is formed in the wafer 52 such a side bar section 58 is formed on each side of the channel 54, with the closure section 60 extending the length of the channel 54 on a face 62 of the column section 50 opposite to the channel 54. The channel 54 is dimensioned to receive the array 12 therein. Thus, the channel 54 may be about 10 mm wide and have a depth equal to the depth of the array 12, in one embodiment.

A plurality of grooves 24 may be formed in the face 62 of the column section 50 to provide a plurality of ridges 28, which comprise the strips of closures 402 in this embodiment. The plurality of ridges 28 are formed so that the strips of closures 402 are aligned with the rows 14 of the array 12, when the array 12 is bonded to the column section 50. The plurality grooves 24 and ridges 28 may be formed, such that they extend across the entirety of the face 62 of the column section 50 including the closure section 60 and side bar sections 58. Extending the plurality grooves 32 and ridges 34 across the entirety of the face 62 of the column section 50 provides a column 10A that closely resembles the prior art columns to further facilitate processing.

The array 12 is bonded to sides 64 of the channel 54 using known methods. The array 12 is bonded to the channel 54, so that the rows 14 (not clearly seen in this Figure) are aligned with the strips of closures 402. The strips of closures 402/ridges 28 may then be ground and lapped to a selected thickness, as discussed previously.

Figure 13:
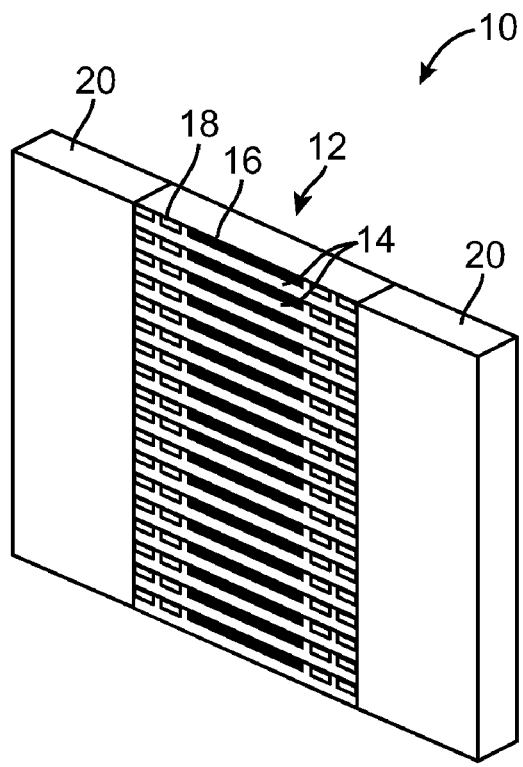
FIG. 13 illustrates a partially fabricated a column of magnetic chips that has been constructed according to an alternative embodiment of the invention.
Figure 14:
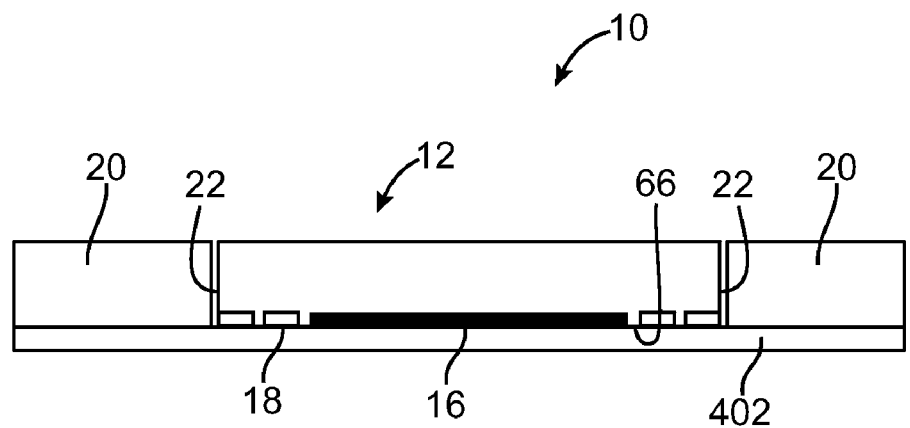
FIG. 14 illustrates a partially exploded top plan view of the alternative embodiment of the invention of FIG. 13.

FIG. 13 and FIG. 14 illustrate another embodiment of the invention. In this embodiment, after fabrication of the array 12, a side bar 20 is bonded each side 22 of the array 12 to form the column 10. As noted previously, the side bars 20 comprise a suitable known substrate material, such as $Al_2O_3TiC$. The side bars 20 are dimensioned so that the face 26 of the side bars 20 is collinear with a front side 66 of the array 12.

Once the side bars 20 are bonded to the array 12, the column 10 is closed as discussed previously. For example, a closure quad 400 (substantially as shown in FIG. 8) is bonded to the column 10, such that the closure quad 400 is bonded to both the array 12 and to the front 26 of the side bars 20. Once the closure quad 400 is bonded to the column 10, grinding is used to remove the top portion 404 of the closure quad 400, to expose the closures 402 (shown in FIGS. 6 and 7). After the top portion 404 is removed, the closures 402 are lapped to a desired width.

Figure 15:
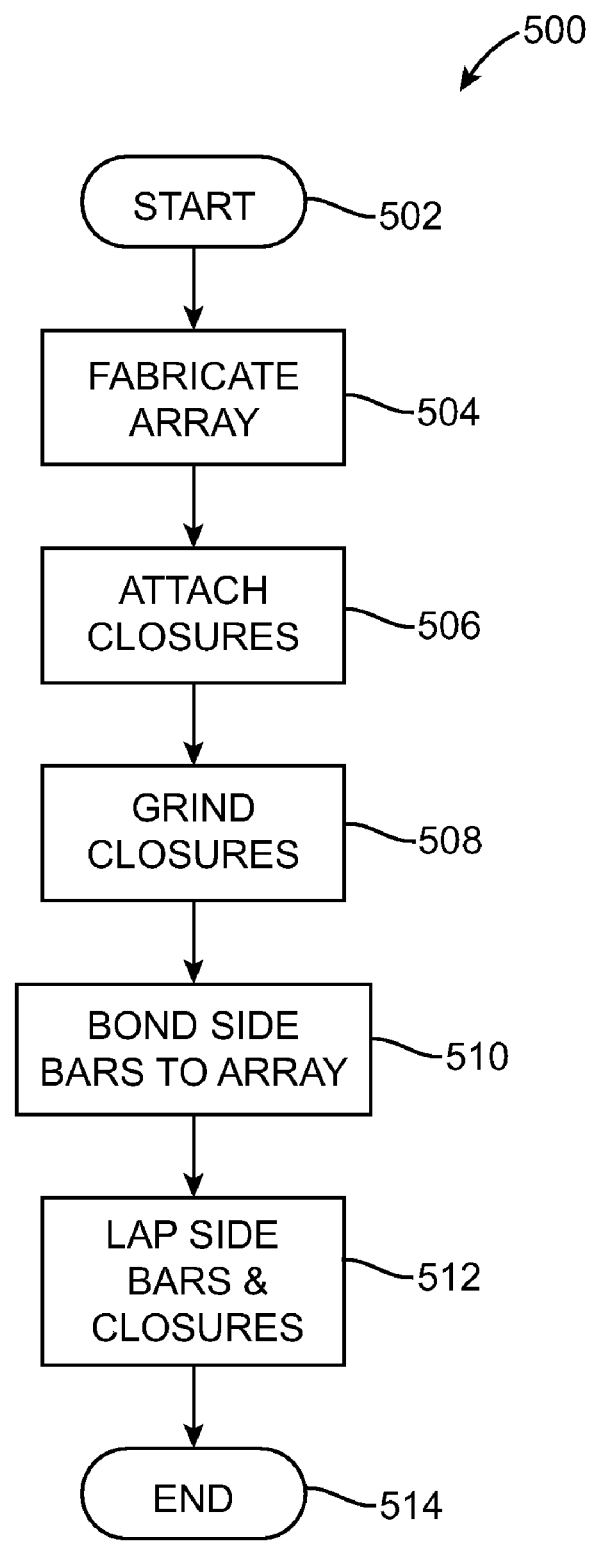
FIG. 15 is a flow diagram showing method for fabricating a column of magnetic chips according to one embodiment of the invention.

Referring now to FIG. 6 and FIG. 15, there is shown a flow diagram 500 illustrating an embodiment of a method of fabricating magnetic read/write heads, such as magnetic tape heads and particularly mini-chiplet heads, with a thin closure. Execution of the method commences in start block 502. In process block 504, an array 12 of chips 16 is fabricated on a wafer using known methods. The array 12 comprises several rows 14, with each row 14 comprising a chip 16 and ELGs 18.

After fabrication of the array 12, in process block 506, the array 12 is closed. In process block 508, the strips of closures 402 are ground to a selected thickness. Typically the closures 402 are lapped to a thickness ranging from about 280 micrometers to 250 micrometers, but may be lapped to a reduced thickness. For example, the closures 402 may be lapped to a reduced thickness of about 25 to 50 micrometers.

In process block 510, the one side bars 20 are bonded to each side 22 of the array 12 to form a column 10. Once the side bars 22 are bonded to the array 12, the ridges 28 of the side bars 20 are lapped, in process block 512. The ridges 28 are lapped to align them with the closures 402. Any additional lapping of the closures 402 may also be performed in the process step, to obtain the selected thickness of the closures 402. The method terminates in end block 514.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for fabricating thin closure magnetic heads comprising:
   providing an array of chips;
   attaching closures to the array;
   lapping strips of closures to a predetermined thickness;
   attaching side bars to the array to form a column; and
   lapping a face of the side bars.

2. The method of claim 1 further comprising:
   closing the array such that a strip of closures is attached to each row of the array; and
   lapping the strips of closures to the predetermined thickness.

3. The method of claim 1 further comprising:
   forming more than one groove in the face of each side bar, such that a ridge is formed between adjacent grooves, the ridges aligned with each strip of closures; and
   lapping the ridges to make the ridges collinear with the strips of closures.

4. The method of claim 1 wherein the strips of closures are lapped to a thickness less than about 250 micrometers.

5. The method of claim 4 wherein the strips of closures are lapped to a thickness than about 100 micrometers.

6. A method for manufacturing a column of magnetic tape heads comprising the following steps:
   providing an array of chip images;
   bonding a strip of closures to each row of chip images of the array;
   lapping the closures;
   bonding side bars to the array of chip images; and
   lapping ridges of the side bars to make the ridges collinear with the strips of closures.

7. The method of claim 6 wherein the strips of closures are lapped to a first thickness prior to bonding the side bars to the array.

8. The method of claim 6 further comprising:
   grinding a plurality of grooves in a face of each the side bar, the grooves providing a plurality ridges between adjacent grooves, the grooves etched in the face of each the side bar such that the ridges are aligned with each strip of closures.

9. The method of claim 8 further comprising:
   lapping the strips of closures and ridges of the side bars to a predetermined thickness.

10. The method of claim 9 wherein the strips of closures are lapped to a thickness less than about 200 micrometers.

11. The method of claim 9 wherein the strips of closures are lapped to a thickness than about 100 micrometers.

12. The method of claim 9 wherein the strips of closures are lapped to a thickness than about 75 micrometers.

* * * * *